United States Patent Office 3,455,869
Patented July 15, 1969

3,455,869
CURABLE, FILLED UNSATURATED POLYESTER RESIN MIXTURES
Otto Ernst, Pfeffingen, Ulrich Niklaus, Munchenstein, and Hans Batzer, Arlesheim, Switzerland, assignors to Ciba Limited, Basel, Switzerland, a company of Switzerland
No Drawing. Filed Dec. 27, 1966, Ser. No. 604,617
Claims priority, application Switzerland, Jan. 10, 1966, 252/66
Int. Cl. C08f 45/14, 43/02
U.S. Cl. 260—40                                    3 Claims

ABSTRACT OF THE DISCLOSURE

Curable resin mixtures that contain as resin component an unsaturated polyester, one or more than one curing catalyst and fillers, characterized in that the filler consists at least partially of a nitrogenous compound from the group of the triazine derivatives or dicyanidiamide, the said nitrogenous compound having a molecular weight not exceeding 1000, a melting point above 120° C. and not being appreciably soluble in the resin component at 120° C. and are primarily utilized for the production of castings, especially useful in the electrical industry in overhead insulators and in insulating components of electrical apparatus.

---

It is known to use fillers in castings from casting resins based on unsaturated polyesters, whereby in many cases the properties of the casting are significantly modified. Inter alia, is it possible to improve the mechanical properties and, for example, the heat distortion characteristics according to Martens, and quite generally the cost of the casting resin composition is lowered. Other not inconsiderable advantages are the reduced shrinkage in volume of the casting composition during curing and the less pronounced exothermic reaction. However, most known fillers have distinct disadvantages. For instance, when the inorganic fillers most commonly employed in industry are used, the abrasive action experienced in processing the castings and the increase in the specific gravity of the castings are felt to be disadvantages. Above all in the electrical industry the use of unsaturated polyester resins extended with fillers is limited ownig to the poor stability towards leakage currents and electric arcs and also by the generally substantial increase in the dielectric losses. When, for example, quartz meal is used as filler, the electrical properties of unsaturated polyester casting resins are impaired. To overcome these disadvantages it has already been proposed to use a variety of special inorganic fillers, such as calcium sulphate dihydrate, alumina, kaolin, silicates and graphite, which products improve or maintain the stability towards leakage currents and/or electric arcs, and some of them do not significantly increase the dielectric loss factor tgδ, but none of these proposed fillers combines all three electrical properties mentioned in the positive sense. Finally, DAS 1,194,141 in the name of Badische Anilin- & Soda-Fabrik Aktiengesellschaft, Ludwigshafen (Rhine), published June 3, 1965, proposed a process for the manufacture of polyester casting compositions containing as fillers, inter alia, pulverulent polystyrene or ground, cured polyester compositions, but when these fillers are used, the resulting castings do not display a satisfactory stability towards the electric arc.

When unsaturated polyesters are used as the resin component, the afore-mentioned disadvantages can be completely or at least substantially avoided and more especially good stability towards the electric arc and a lower dielectric loss factor can be achieved by using as filler dicyandiamide or certain triazine derivatives having a molecular weight not greater than 1000, a melting point above 120° C. and not being appreciably soluble in the resin component at 120° C.

Very suitable as such fillers are primarily melamine, acetoguanamine, benzoguanamine, cyanuric acid and dicyandiamide.

Another advantage of the nitrogenous fillers of this invention is the fact that even a relatively small addition thereof to electrically poor fillers, such as quartz meal, suffices to bring about a considerable improvement.

Accordingly, the present invention provides curable resin mixtures that contain as resin component an unsaturated polyester, one or more than one curing catalyst and fillers, characterized in that the filler consists at least partially of a nitrogenous compound from the group for the triazine derivatives or dicyandiamide, the said nitrogenous compound having a molecular weight not exceeding 1000, a melting point above 120° C. and not being appreciably soluble in the resin component at 120° C. The nitrogenous compound is preferably used in an amount of at least 30, and especially from 40 to 200, parts by weight for every 100 parts by weight of the unsaturated polyester.

The term "curing" as used in this context describes the conversion of the above-mentioned resin systems into insoluble and infusible, crosslinked products, as a rule simultaneously with shaping to furnish shaped products, such as castings, mouldings or laminates, or flat structures such as lacquer films or cemented products.

Among triazine derivatives suitable as fillers according to this invention there are, for example, ammeline, ammelide, melam, formoguanamine, acetoguanamine, benzoguanamine, mono- alkylmelamines, N-phenylmelamine, mono-, di-, tri-, tetra-, penta- and hexamethylolmelamine, tetrahydrobenzoguanamine, hexahydrobenzoguanamine and especially cyanuric acid, melamine and dicyandiamide.

The unsaturated polyesters to be used in the curable mixtures of this invention may belong to any known type. There may be mentioned (a) Unsaturated polyesters in the narrow sense from α,β-unsaturated dicarboxylic or polycarboxylic acids and diols or polyols which, if desired, may be modified with saturated dicarboxylic or polycarboxylic acids. As α,β-unsaturated polycarboxylic acids from which such polyesters may be derived there may be mentioned: Maleic, fumaric, mesaconic, citraconic, itaconic, tetrahydrophthalic and aconitic acid.

As diols or polyols from which such unsaturated polyesters may be derived there may be mentioned:
Ethylene glycol, diethylene glycol, triethylene glycol, propylene glycol-1,2, propylene glycol-1,3, butanediol-1,4, 2-methylpentanediol-2,4, pentanediol-1,5, hexanediol-1,6; bis-β-hydroxyethyl ethers of bisphenol A [=2,2'-bis(para-hydroxyphenyl)propane] or of tetrachlorobisphenol A; glycerol, diglycerol, trimethylolethane, trimethylolpropane, butanetriol-(1,2,4); hexanetriol, pentaerythritol and pentachlorophenyl glycerol ether.

As examples of saturated dicarboxylic or polycarboxylic acids which, if desired, may be additionally used to modify the unsaturated polyesters there may be mentioned: Oxalic, succinic, glutaric, adipic, pimelic, suberic, azelaic, sebacic, hexahydrophthalic and tricarballylic acid; also phthalic, isophthalic, terephthalic, 2,6-naphthalenedicarboxylic, diphenyl-ortho,ortho'-dicarboxylic acid, ethylene glycol-bis(para-carboxyphenyl)ether, tetrachlorophthalic acid, hexachloro-endomethylene-tetrahydrophthalic and tetrachlorosuccinic acid.

(b) Unsaturated polyesters from unsaturated dialcohols or polyalcohols and unsaturated dicarboxylic or polycarboxylic acids which, if desired, may be modified by saturated dialcohols or polyalcohols and/or saturated dicarboxylic or polycarboxylic acids. As unsaturated polyols from which such polyesters are derived there may be mentioned: 1,6 - bis(hydroxymethyl)-2,5-endomethylene - cyclohexene-3, 1,1-bis(hydroxymethyl)-cyclohexene-3 and 1,1-bis(hydroxymethyl)-6-methyl-cyclohexene-3.

As unsaturated polycarboxylic acids and possibly additionally used saturated polycarboxylic acids and saturated polyalcohols the unsaturated polyesters sub (a) may be also be used for synthesizing the unsaturated polyesters sub (b).

(c) The still soluble and fusible prepolymers and telomers obtained by prepolymerization or telomerization respectively of the diallyl esters or bis(chlorallyl) esters of dicarboxylic acids, especially of aromatic dicarboxylic acids such as phthalic acid, in the presence of a suitable regulator or telogen respectively, such as alcohols, ketones, hydrogen chlorides, dialkylphosphites, being, for example, the prepolymers of diallylphthalate marketed under the registered trademark Dapon.

For such curable, unsaturated polyester resin systems there may be used the known free radical forming curing catalysts, especially organic peroxides such as benzoyl peroxide, methylethylketone peroxide, tertiary butyl hydroperoxide, ditertiary butyl peroxide or hydroxycyclohexyl hydroperoxide.

As curing accelerators there may be additionally used soluble metal salts, for example vanadium salts such as vanadium phosphonates, also iron, nickel and more especially cobalt salts of high-molecular organic acids, such as cobalt octoate or cobalt naphthenate. An addition of such metal accelerators is particularly useful when the compositions are to be used for the production of coatings or the like, which are to be cured in the presence of atmospheric oxygen, because in this case the polymerization curing in the mass is promoted and improved by an additional oxidative drying process on the surface. Further suitable curing accelerators are tertiary aromatic amines such as N,N-dialkylanilines.

The unsaturated polyester resin systems further contain with advantage copolymerizable monomers, especially styrene, acrylic acid esters or diallylphthalate. Additionally, also organic solvents and/or plasticizers may be added.

surface (Aerosil) or metal powders such as aluminium powder.

The filled resin mixtures of this invention are primarily used in the casting resin sector. The resulting castings may be used for a wide variety of structural elements, especially in the electrical industry, above all, for example, as high-voltage transport lugs, pin type and suspension insulators (also on overhead lines), as well as for insulating components of electrical switchgear, such as load shedding switches and quenching chambers, also for bushings and terminals, and in the manufacture of voltage and current transformers. The new resin mixtures are also suitable for satisfactory use in other sectors, for example as laminating resins, binding agents, moulding compositions, sinter powders, coating compositions, sealing compounds and putties, impregnating and dipping resins.

Unless otherwise indicated, parts and percentages in the following examples are by weight. The relationship between part by weight and part by volume is the same as that between the gram and the millilitre.

EXAMPLE 1

The casting resin mixtures (specimens 1 to 8) listed in the following table were obtained by mixing the ingredients at room temperature and, to determine their properties, they were poured into aluminium moulds (40 x 10 x 140 mm.; 130 x 130 x 2 mm.; 130 x 130 x 44 mm.), gelled at room temperature within 5 hours and then cured for 4 hours at 90° C.

In this table:

Polyester resin I is an unsaturated, highly transparent low-viscous polyester resin, dissolved in acrylic ester, marketed under the registered trade name Polylite TX.

Polyester resin II is an unsaturated polyester resin, dissolved in styrene, marketed under the registered trade name Leguval W–50 (acid number under 15; styrene content 40%; viscosity at 20° C. about 3000 centipoises; specific gravity 1.10).

Compared with the unfilled systems or those filled with quartz meal the specimens containing fillers of this invention posses improved arc resistance and compared with the latter also display dielectric losses at 20° C. and 60° C.

| Specimen | 1 | 2 | 3 | 4 | 5 | 6 | 7 | 8 |
| --- | --- | --- | --- | --- | --- | --- | --- | --- |
| Polyester resin I | 100 | 100 | 100 | 100 | | | | |
| Polyester resin II | | | | | 100 | 100 | 100 | 100 |
| Methylethylketone peroxide 40% in dibutylphthalate | 3 | 3 | 3 | 3 | 3 | 3 | 3 | 3 |
| Solution of cobalt naphthenate in dibutylphthalate containing 6% of cobalt metal | 0.2 | 0.2 | 0.2 | 0.2 | 0.2 | 0.2 | 0.2 | 0.2 |
| "Quarzmehl K8" | | 160 | | | | 100 | | |
| Melamine | | | 50 | | | | 40 | |
| Benzoguanamine | | | | 80 | | | | 50 |
| Heat distortion point according to Martens DIN, in ° C | 52 | 61 | 55 | 57 | 54 | 67 | 60 | 58 |
| Arc resistance VDE 0303, stage | L1 | L1 | L4 | L4 | L1 | L1 | L4 | L4 |
| Dielectric loss factor tg δ (50 cps.) in percent: | | | | | | | | |
| At 20° C | 1.0 | 2.6 | 0.7 | 1.4 | 0.4 | 2.1 | 0.5 | 0.9 |
| At 60° C | 3.5 | 8.3 | 2.3 | 4.5 | 1.0 | 3.9 | 1.2 | 2.2 |

It is, of course, possible to incorporate in the curable resin systems of this invention conventional additives such as mould lubricants, antioxidants, flame-inhibitors, dyestuffs or pigments.

The amount of triazine derivative, urea, thiourea or guanidine or derivatives thereof to be added is advantageously at least 30 parts by weight for every 100 parts by weight of the unsaturated polyester. A preferred amount is 40 to 200 parts by weight of nitrogenous filler for every 100 parts by weight of unsaturated polyester.

If desired, the curable resin mixtures of this invention may contain in addition to the new nitrogenous fillers also other known fillers and/or reinforcing agents, for example glass fibres, mica, quartz meal, cellulose, kaolin, ground dolomite, colloidal silica having a large specific

EXAMPLE 2

Specimens 1 to 11 were prepared as described in Example 1, except that curing was performed for 24 hours at 40° C.

In the table:

Polyester resin III is an unsaturated polyester resin, dissolved in styrene, marketed under the registered trade name Polylite 8001 (acid number 30; styrene content 33%; viscosity at 20° C. 1100 to 1300 centipoises; specific gravity 1.13).

The specimens 3 and 7 to 11 according to this invention display throughout a relatively high heat distortion point according to Martens DIN, a very good arc resistance and low dielectric losses at 20° C. and 40° C., whereas none of the reference specimens combines all these good properties.

| Specimen | 1 | 2 | 3 | 4 | 5 | 6 | 7 | 8 | 9 | 10 | 12 |
|---|---|---|---|---|---|---|---|---|---|---|---|
| Polyester resin II | 100 | 100 | 100 | | | | | | | | |
| Polyester resin III | | | | 100 | 100 | 100 | 100 | 100 | 100 | 100 | 100 |
| Benzoyl peroxide (50% paste in dibutylphthalate) | 4 | 4 | 4 | 4 | 4 | 4 | 4 | 4 | 4 | 4 | 4 |
| 5% solution of N,N-diethylaniline in dibutylphthalate | 1 | 1 | 1 | 1 | 1 | 1 | 1 | 1 | 1 | 1 | 1 |
| Quartz meal | | 100 | | | 120 | | | | | | |
| Alumina hydrate | | | | | | 120 | | | | | |
| Dicyandiamide | | | | | | | | 50 | | | |
| Melamine | | | 50 | | | | | | 50 | | |
| Cyanuric acid | | | | | | | | | | 50 | |
| Acetoguanamine | | | | | | | | | | | 50 |
| Dicyandiamide | | | | | | | | | | | 50 |
| Heat distortion point according to Martens DIN, in °C | 56 | 65 | 63 | 40 | 62 | 54 | 67 | 66 | 69 | 46 | 44 |
| Arc resistance VDE 0303, stage | L1 | L1 | L4 | L1 | L1 | L4 | L4 | L4 | L4 | L4 | L4 |
| Dielectric loss factor tg δ (50 cps.) in percent: | | | | | | | | | | | |
| At 20° C | 0.5 | 2.2 | 0.4 | 0.8 | 3.3 | 8.5 | 0.8 | 0.7 | 0.7 | 1.0 | 0.7 |
| At 40° C | 0.7 | 2.9 | 0.7 | 4.8 | 5.0 | 1.5 | 1.5 | 1.2 | 1.4 | 6.0 | 2.8 |

EXAMPLE 3

The test specimens were prepared as described in Exapmle 1. The unsaturated polyester resin IV used in Example 1. The unsaturated polyester resin IV used was prepared by reacting at an elevated temperature 5 mols of isophthalic acid, 1 mol of phthalic anhydride and 6 mols of maleic anhydride with 12.5 mols of propylene glycol in the presence of 0.02% by weight of hydroquinone, and the resulting solid condensation product (acid number 25) was mixed with styrene so that the polyester resin IV ready for use had a styrene content of 30% and a viscosity of about 5000 centipoises at 25° C.

In this experiment, too, the specimens 4 to 7 according to this invention display the highest arc resistance and at the same time low dielectric losses at room temperature and at a slightly raised temperature.

| Specimen | 1 | 2 | 3 | 4 | 5 | 6 | 7 |
|---|---|---|---|---|---|---|---|
| Polyester resin IV | 100 | 100 | 100 | 100 | 100 | 100 | 100 |
| Methylethylketone peroxide, 40% in dibutylphthalate | 3 | 3 | 3 | 3 | 3 | 3 | 3 |
| Solution of cobalt naphthenate in dibutylphthalate (containing 6% of cobalt) | 0.2 | 0.2 | 0.2 | 0.2 | 0.2 | 0.2 | 0.2 |
| "Quarzmehl K8" | | 100 | | | | | |
| Alumina trihydrate | | | 100 | | | | |
| Acetoguanamine | | | | 35 | | | |
| Melamine | | | | | 50 | | |
| Benzoguanamine | | | | | | 50 | |
| Cyanuric acid | | | | | | | 50 |
| Heat distortion point according to Martens DIN, in °C | 64 | 76 | 74 | 65 | 71 | 66 | 69 |
| Arc resistance VDE 0303, stage | L1 | L1 | L4 | L4 | L4 | L4 | L4 |
| Dielectric loss factor tg Δ (50 cps.), in percent: | | | | | | | |
| At 20° C | 0.5 | 3.1 | 3.0 | 3.5 | 0.5 | 0.6 | 0.4 |
| At 60° C | 1.4 | 4.7 | 9.9 | 5.7 | 1.3 | 2.1 | 1.2 |

What is claimed is:

1. A curable resin composition comprising as the resin component an unsaturated polyester resin, and a curing catalyst for said polyester resin; said resin composition further comprising as essential component a filler consisting at least partially of a nitrogenous compound, the said nitrogenous compound having a molecular weight not exceeding 1000, a melting point above 120° C. and not being appreciably soluble in the resin component at 120° C., said nitrogenous compound being selected from the group consisting of melamine, cyanuric acid, formo-guanamine, acetoguanamine, benzoguanamine and dicyandiamide, and the said nitrogenous compound being present in the composition in an amount of at least 30 parts by weight for every 100 parts by weight of the unsaturated polyester resin.

2. A resin composition according to claim 1, wherein the nitrogenous compound used as filler is present in amount of 40 to 200 parts by weight for every 100 parts by weight of the unsaturated polyester resin.

3. A resin composition according to claim 1, which further comprises a copolymerizable monomer selected from the group consisting of styrene and diallylphthalate.

References Cited

UNITED STATES PATENTS 3,329,739  7/1967  Semroc _____ 260—40
3,361,847  1/1968  Zimmerman et al. _____ 260—864

MORRIS LIEBMAN, Primary Examiner

R. BARON, Assistant Examiner

U.S. Cl. X.R.

260—864